United States Patent [19]

Meguro

[11] 3,873,509

[45] Mar. 25, 1975

[54] PROCESS OF PREPARING PEPTIDES USING DIPHENYL PHOSPHORYL AZIDE

[75] Inventor: Masahiko Meguro, Takarasuka, Japan

[73] Assignee: Daiichi Pure Chemicals Co., Ltd., Tokyo, Japan

[22] Filed: Feb. 14, 1973

[21] Appl. No.: 332,501

[30] Foreign Application Priority Data
Feb. 15, 1972 Japan.............................. 47-15897

[52] U.S. Cl............ 260/112.5, 260/349, 260/471 C, 260/479 C, 260/482 B, 260/482 C
[51] Int. Cl........................ C07c 103/52, C07g 7/00
[58] Field of Search......... 260/112.5, 551 R, 557 R, 260/558 A, 558 R, 561 A, 561 R

[56] References Cited
UNITED STATES PATENTS
3,700,651  10/1972  Yamamura et al. ............ 260/112.5
3,737,423  6/1973  Mukaiyama et al. ............ 260/112.5

OTHER PUBLICATIONS

L'Abbe et al., Tetrahedron, 25, 5421–5426, (1969).

*Primary Examiner*—Lewis Gotts
*Assistant Examiner*—Reginald J. Suyat
*Attorney, Agent, or Firm*—Oblon, Fisher, Spivak, McClelland & Maier

[57] ABSTRACT

Diphenyl phosphoryl azide (DPPA) is prepared by the reaction of diphenyl phosphoryl halide with hydrazoic or derivatives thereof. DPPA can be used in the direct synthesis of urethanes from carboxylic acids and alcohols, and as a reagent in peptide synthesis without racemization of the migrating group in better yields than previously obtainable.

5 Claims, No Drawings

PROCESS OF PREPARING PEPTIDES USING DIPHENYL PHOSPHORYL AZIDE

BACKGROUND OF THE INVENTION

1. Field of the Invention

This invention relates to a diphenyl phosphoryl azide and to methods for preparing the same. It also relates to the use of diphenyl phosphoryl azide as a reagent for the synthesis of urethanes and in peptide synthesis.

2. Description of the Prior Art

Heretofore, a number of well known methods such as the Curtius, Hofmann and Schmidt rearrangements have been used for the synthesis of urethanes. However, these methods are complicated by the fact that strongly acidic or basic conditions are required for the reaction. The azide reagent of this invention (DPPA) overcomes the difficulties of the prior art methods in that the synthesis of urethanes can be conducted under essentially neutral and non-oxidizing reaction conditions.

In the classical azide methods of peptide synthesis, procedures were required which are complicated and involve severe reaction conditions. The azide reagent of the invention (DPPA) offers an improvement over the classical methods of peptide synthesis in that the synthesis reactions can be conducted in the presence of a base in a single step in high yields with no significant racemization of the migrating group.

SUMMARY OF THE INVENTION

Accordingly, it is one object of the present invention to provide a method for the synthesis of dephenyl phosphoryl azide.

Another object of this invention is to provide a reagent which is useful in the synthesis of urethanes.

Yet another object of the invention is to provide a reagent useful in peptide synthesis.

These objects and other objects of this invention as hereinafter will become readily apparent are provided by a method for producing diphenyl phosphoryl azide which comprises reacting diphenyl phosphoryl halide with an azide compound selected from the group consisting of $MN_3$, $HN_3$, $NR_3$ and $HN_3 \cdot HN=C-(NR_2)_2$, wherein M represents a hydrogen atom or an alkali or alkaline earth metal atom and R represents a lower alkyl group.

DESCRIPTION OF THE PREFERRED EMBODIMENTS

The reagent of this invention, diphenyl phosphorylazide can be conveniently prepared in accordance with the following reaction,

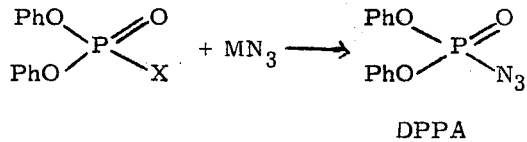

DPPA wherein pH represents a phenyl group, X represents a halogen atom and M represents a hydrogen atom or an alkali or alkaline earth metal atom.

One to five moles, preferably one to two, of diphenyl phosphoryl azide can be used to each reactant (I, II or III).

DPPA is obtained as a stable, nonexplosive liquid (bp. 155°C/0.15mm Hg) in more than 90 percent yield by distilling a reaction mixture of diphenyl phosphoryl halide with hydrazoic acid or one of its alkali, alkaline earth metal or amine salts under a reduced pressure. Suitable salts include sodium azide, potassium azide, barium azide and calcium azide. Suitable amine salts of hydrazoic acid include triloweralkylamine salts of hydrazoic acid such as $(C_2H_5)_3N \cdot HN_3$ and bis-diloweralkylamino guanidine salts such as $((CH_3)_2N)_2=C=NH \cdot HN_3$. However, caution must be used when using the latter two amine salts because of their explosive properties.

The formation of DPPA can usually be conducted at temperatures of and preferably from 0°–50° C. in a suitable inert solvent such as acetone, acetonitrile, pyridine, dimethylsulfoxide, dimethylformamide, tetrahydrofuran, hexamethylphosphoramide, and the like.

DPPA, as prepared by the process of the present invention, undergoes two modes of reaction depending upon the coreactants and reaction conditions as shown in the following reaction scheme.

$$RCOOH + (PhO)_2PO \cdot N_3$$
(I)

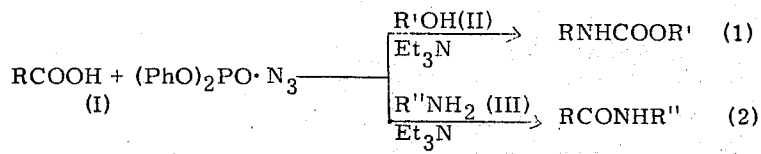

Reaction (1) involves the direct conversion of carboxylic acids to urethanes and Reaction (2) shows the formation of amide bonds.

Reaction (1) may be regarded as a type of modified Curtius rearrangement and has several noteworthy features when compared to the classical conversions such as the Curtius rearrangement, the Hofmann rearrangement or the Schmidt reaction. The present urethane formation reaction is much simpler and less laborious than classical ones, and proceeds under more or less neutral and nonoxidizing conditions. Moreover, neither a strong alkali, as required in the Hofmann reaction, nor a strong acid as required in the Schmidt reaction, is needed.

Both aromatic and aliphatic carboxylic acids (I) when reacted with DPPA give the corresponding urethanes in satisfactory yields. The reaction procedure for urethane formation is very simple and involves the reflux of equimolar quantities of the carboxylic acid (I), the hydroxy component (II), and DPPA in the presence of a triloweralklyamine such as triethylamine for 5 to 25 hours. After evaporation of the solvent, the neutral fraction obtained by treatment of the residue with aqueous acid and alkali is appropriately purified by recrystallization, distillation, or silica gel column chromatography to give the corresponding urethanes.

A series of experiments in which various alcohols and carboxylic acids were reacted with DPPA are listed along with the results of the experiments in Table I.

TABLE 1

| Carboxylic acid (I) (RCOOH) | Hydroxy component (II) (R'OH) | Product | Mp (°C) | Yield (%) |
| --- | --- | --- | --- | --- |
| $C_6H_5COOH$ | tert-butanol | $C_6H_5NHCOOC(CH_3)_3$ | 133–138 | 74 |
| $C_6H_5COOH$ | $C_6H_5OH$ | $C_6H_5NHCOOC_6H_5$ | 127–128.5 | 57 |
| $C_6H_5COOH$ | $C_6H_5CH_2OH$ | $C_6H_5NHCOOCH_2C_6H_5$ | 77–78 | 61 |
| $CH_3(CH_2)_6COOH$ | tert-butanol | $CH_3(CH_2)_6NHCOOC(CH_3)_3$ | (Bp.112/2mmHg) | 67 |
| $C_6H_5CH_2CH_2COOH$ | tert-butanol | $C_6H_5CH_2CH_2NH-COOC(CH_3)_3$ | 56–57 | 61 |
| $C_6H_5CH=CHCOOH$ | tert-butanol | $C_6H_5CH=CHNHCOOC(CH_3)_3$ | 139–141 | 70 |
| $HOOC(CH_2)_4COOH$ | tert-butanol | $(CH_3)_3C-OCONH(CH_2)_4-$ NHCOOC(CH$_3$)$_3$ | 137–139 | 53 |
| N-carbobenzoxy-L-serine | N-carbobenzoxy-L-serine | 4-carbobenzoxyamino-2-oxazolidone | 174–175 | 71 |
| pyridine-2-carboxylic acid* | tert-butanol | tert-butyl 2-pyridine-carbamate | 96.5–97.5 | 73 |

*Pyridine-2-carboxylic acid failed to undergo the Schmidt reaction.

Reaction (2) in which a carboxylic acid is reacted with an amine to form an amide can be advantageously applied to peptide synthesis. In peptide synthesis, the well-known azide method is still the only method reliably and widely employed to obtain peptides via a racemization-free condensation reaction. However, the yields of the coupling reaction are not always high. Moreover, in the classical method, several processes which are complicated and involve severe conditions are essential for preparing the corresponding carboxylic azides from an amino acid or a peptide fragment. In comparison with the classical azide method the use of DPPA permits the coupling reaction to proceed in higher yields in the presence of a base in a single process. In addition, no significant racemization occurs in the coupling reaction in which DPPA is used as a reactant. This fact is confirmed by the supersensitive Young test, which gave 94.5 percent of the L-isomer of N-benzoyl-L-leucylglycine ethyl ester in 83 percent yield. Moreover, oxazolone formation, which is mainly responsible for racemization during the coupling reaction, could not be detected in view of the lack of infrared absorption at 1830 cm$^{-1}$.

A preferable procedure for peptide synthesis with DPPA is as follows. To a stirred mixture of an acyl-amino acid or a peptide (1 equiv.) and another amino acid or peptide ester hydrochloride (1.1 to 1.2 equiv.) in dimethylformamide is added DPPA (1.1 to 1.2 equiv.) in dimethylformamide at or below 0°C. This is followed by the addition of triethylamine (2.1–2.2 equiv.). The mixture is stirred at or below 0°C for several hours, and at room temperature overnight. In this manner, the following series of peptides were synthesized and the results are listed in Table II.

(Z) and (Boc) represent the protective benzyloxycarbonyl group and the protective tertiary butyloxcarbonyl group, respectively. The other symbols are representative of the amino acid residues as defined below:

Leu: leucine  Thr: threonine
Val: valine  Met: methionine
Phe: phenylalanine  Gly: glycine
Asp: asparagine  Trp: tryptophane
Gln: glutamine  Arg: arginine
Ser: serine  His: histidine
Tyr: tyrosine The advantages in the use of DPPA in peptide synthesis include high yields of the peptide products in the coupling reaction without racemization, the use of the amine component as its hydrochloride with one equiv of a tertiary amine, and the use of a highly polar solvent such as dimethylformamide in which even large molecular weight peptides are often soluble. These features widen the scope of the applicability of DPPA in peptide synthesis. The method is very general in the sense that it can be used to form peptides containing various functional groups. No difficulties were encountered when the side chains of asparagine, glutamine, valine, threonine, methionine, tryptophane, or histidine were present in the carboxyl residue. Arginine presented no difficulties when its guanido group was protected with a nitro group. Serine and tyrosine could be used as the amine component in the reaction without protection of their hydroxyl functional groups.

Having generally described this invention, a further understanding can be obtained by reference to a specific example which is provided herein for purpose of

TABLE II

| Carboxylic component (I) | Amine component (III) | Product | Mp.(°C) | Yield (%) |
| --- | --- | --- | --- | --- |
| (Z)-Leu-Leu | HCl.Val-Phe-OMe | Z-Leu-Leu-Val-Phe-OMe | 209–210 | 87 |
| (Z) Asp | Phe-OMe | (Z)Asp-Phe-OMe | 198–200 | 80 |
| (Z)Gln | Ser-OMe | (Z)Gln-Ser-OMe | 166–167 | 80 |
| (Z)Val | Tyr-OMe | (Z)Val-Tyr-OMe | 157–158 | 69 |
| (Z)Thr | Phe-OMe | (Z)Thr-Phe-OMe | 106–108 | 72.5 |
| (Z)Met | Gly-OEt | (Z)Met-Gly-OEt | 98–99 | 90 |
| (Boc)Trp | Gly-OEt | (Boc)Trp-Gly-OEt | 118–119 | 89.5 |
| (Z)Arg(NO$_2$) | Leu-OMe | (Z)Arg(NO$_2$)-Leu-OMe | 163–164 | 83 |
| (Z)His | Leu-OMe | (Z)His-Leu-OMe | 126.5–127 | 95 |

EXAMPLE 1

A 15.6g (0.24 mole) quantity of sodium azide was suspended in 250 ml of dry acetone and 53.7g(0.20 mole) of diphenyl phosphorylchloride was added to the suspension. The mixture was stirred at room temperature for 20 hours. The reaction mixture was filtered and the filtrate was concentrated in vacuo. The residue was distilled under reduced pressure to give 50.2g of diphenyl phosphoryl azide boiling at 155°C/0.15 mm Hg. Yield=91 percent.

Having now fully described this invention, it will be apparent to one of ordinary skill in the art that many changes and modifications can be made thereto without departing from the spirit or scope of the invention as set forth herein.

What is claimed as new and desired to be secured by Letters Patent of the United States is:

1. A method for producing a peptide which comprises reacting a N-protected reactant peptide with an amino acid ester or a peptide ester in a solvent with diphenyl phosphoryl azide in the presence of triloweralkylamine.

2. The method of claim 1, wherein said reactant peptide is benzyloxycarbonyl protected leucine-leucine peptide, and said peptide ester hydrochloride is valine-phenylalanine methyl ester.

3. A method for producing a peptide which comprises reacting an N-protected amino acid with an amino acid ester or a peptide ester in a solvent with diphenylphosphoryl azide in the presence of triloweralkylamine.

4. The method of claim 3, wherein said protecting group is an acyl group selected from the group consisting of Z or BOC.

5. The method of claim 3, wherein said N-protected amino acid is benzyloxycarbonyl protected asparagine, and said amino acid ester is the methyl ester of phenylalanine.

* * * * *

UNITED STATES PATENT AND TRADEMARK OFFICE
Certificate

Patent No. 3,873,509                                    Patented March 25, 1975

Masahiko Meguro

Application having been made by Masahiko Meguro, the inventor named in the patent above identified, and Dauchi Pure Chemicals Co., Ltd., Tokyo, Japan, the assignee, for the issuance of a certificate under the provisions of Title 35, Section 256, of the United States Code, adding the names of Shunichi Yamada and Takayuki Shiori as joint inventors, and a showing and proof of facts having been submitted, it is this 29th day of March 1977, certified that the names of the said Shunichi Yamada and Takayuki are hereby added to the said patent as joint inventors with the said Masahiko Meguro.

FRED W. SHERLING,
*Associate Solicitor.*